F. A. EUSTIS, C. R. HAYWARD, H. M. SCHLEICHER, AND D. BELCHER.
ART OF MAKING ELECTROLYTIC IRON.
APPLICATION FILED JAN. 17, 1922.
1,432,544.
Patented Oct. 17, 1922.
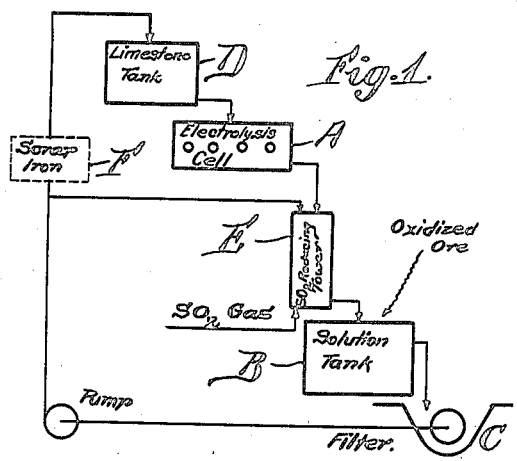
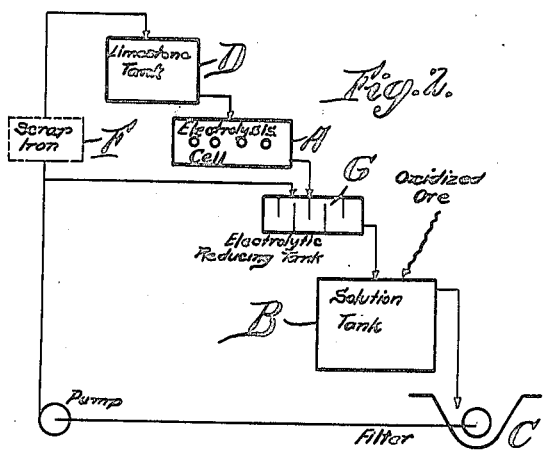

Patented Oct. 17, 1922.

1,432,544

UNITED STATES PATENT OFFICE.

FREDERIC A. EUSTIS, OF MILTON, CARLE R. HAYWARD, OF QUINCY, AND HENRY M. SCHLEICHER AND DONALD BELCHER, OF BOSTON, MASSACHUSETTS, ASSIGNORS, BY DIRECT AND MESNE ASSIGNMENTS, OF ONE-HALF TO SAID EUSTIS AND ONE-HALF TO CHARLES PAGE PERIN, OF NEW YORK, N. Y.

ART OF MAKING ELECTROLYTIC IRON.

Original application filed December 1, 1920, Serial No. 427,541. Divided and this application filed January 17, 1922. Serial No. 529,859.

To all whom it may concern:

Be it known that we, FREDERIC A. EUSTIS, of Milton, CARLE R. HAYWARD, of Qunicy, both in the county of Norfolk, HENRY M. SCHLEICHER and DONALD BELCHER, of Boston, in the county of Suffolk, all in the Commonwealth of Massachusetts, all citizens of the United States, have invented new and useful Improvements in the Art of Making Electrolytic Iron, of which the following is a specification.

This invention relates to the manufacture of electrolytic iron from solutions, and particularly to the preparation of the ferrous solution from oxides of iron for the electrolytic deposit of iron.

The present application is a division of an application filed by us December 1, 1920, Serial No. 427,541, now Letters Patent of the United States No. 1,412,174, dated April 11, 1922, and is addressed particularly to that modification of the invention described in our said former application adapted for the treatment of oxidized ores of iron, or other oxides of iron.

It has heretofore been considered that oxides of iron were practically insoluble, and so far as we are aware they are insoluble by any process heretofore known. Therefore oxidized ores of iron, and other sources of ferric oxide, have not been considered practicable sources of supply for the manufacture of electrolytic iron by dissolving iron to form a ferrous solution and thereafter depositing iron from the solution by the action of electrolysis.

We have discovered that oxides of iron may be dissovled from oxidized ores of iron or other similar source by means of a solvent containing dilute acid and suitable quantities of ferrous salts. For example a solution containing dilute hydrochloric acid and a generous quantity of ferrous chloride, or a solution containing dilute sulphuric acid and a generous quantity of ferrous sulphate, will act as a solvent of oxides of iron and after reduction form a ferrous solution suitable for the electrolytic deposit of iron.

For a detailed description of our process as a whole reference is made to our said Patent No. 1,412,174. The invention forming the subject-matter of the present application has to do primarily with the use of ferric oxide as the source of iron and we will therefore describe herein only such features of the general process as are necessary to make clear its applicability to the treatment of oxides of iron. The oxide of iron used as the source of iron in the present process is preferably in the form of an oxidized ore of iron such as limonite, hematite or magnetite.

The ferrous solution from which iron is deposited by electrolysis may be a solution of ferrous chloride in water, a ferrous sulphate solution, or indeed a solution containing any salts of iron that will in solution dissociate to deposit iron under the action of electrolysis, that will form the two series of salts, ferric and ferrous, and that will attack the ore or other raw material constituting the source of iron.

The ferrous solution when made by the method hereinafter described will contain at least some acid or ferric salts, such as ferric chloride, although it may be only traces, and must be thorougly neutralized before it is suitable for the production of electrolytic iron, because the presence of acid or ferric salts causes a poor iron deposit and results in low current efficiency. To this end the solution is mixed with pulverized limestone in a suitable tank. Limestone furnishes calcium carbonate ($CaCO_3$) which is the most suitable agent for neutralization, as it has the capacity of readily precipitating first ferric salts before precipitating the ferrous salts. We have found that for the best results it is advisable to use enough neutralizing agent to precipitate a small amount of ferrous iron. This insures complete neutralization of the liquor, the neutrality of the solution in the cathode compartment of the electrolytic cell being an indispensible condition for the most efficient electrolysis of iron.

The solution is then filtered if necessary, heated nearly to the boiling point, and passed hot into the cathode compartment of a diaphragm electrolytic cell. Under proper conditions metallic iron is deposited on the cathode. The liquor passes through the diaphragm into the anode compartment and is thence returned to the process to be used in making more ferrous solution as hereinafter described.

A special electrolysis cell A is used for depositing the iron, of the kind fully described in our said former patent to which reference is made for a more detailed description of its construction and mode of operation.

The accompanying drawings indicate diagrammatically apparatus for performing the process, illustrating in two alternative forms the cycles of operations.

Referring first to Fig. 1, the anode liquor containing ferric chloride and ferrous chloride, (or ferric and ferrous sulphates if the original solution was a sulphate instead of a chloride) should first be reduced to a ferrous solution. The hot anode liquor is discharged from the anode compartment of electrolytic cell A into the top of a reducing tower E packed with coke. A gas containing sulphur dioxide ($SO_2$) is introduced at the bottom of the tower and rising through the tower comes into contact with the descending solution. This reduces the ferric chloride (or sulphate) to ferrous chloride (or sulphate) and the resulting liquor discharged from the reducing tower contains a large amount of ferrous chloride (or sulphate), a small amount of sulphuric acid and a small amount of hydrochloric acid. This constitutes a leach liquor by which the oxides of iron may be dissolved from the oxidized ore. This liquor possesses a peculiar ability with great rapidity and substantial completeness to dissolve the relatively insoluble ferric oxides. The reduced leach liquor is then put on the ore in a solution tank B where it dissolves iron from the ore, and is then filtered at C. Thence the major part of the solution is pumped back to the top of the reducing tower, while the smaller part will be advanced to limestone tower D for neutralizing and thereafter electrolyzing at A as before. The part which is sent to the limestone tower may optionally be passed through scrap iron in a tank F for the purpose of further enriching the solution in iron and at the same time using up part of the acid coming from the solution tank B.

As an alternative method of reducing the anode liquor, it may be delivered from the main electrolysis tank A in which the iron is deposited, into a second electrolytic cell G (see Fig. 2) which may be termed an electrolytic reducing cell. The application of electric energy to the ferric solution in the electrolytic reducing cell G will reduce the solution from the ferric to ferrous state. This reduction of the ferric salts formed in the electrolysis cell A furnishes acid needed for dissolving the oxidized ore. In other respects the procedure may be the same as indicated in Fig. 1.

The reason for returning the greater part of the liquor from the ore solution tank to the reducing tower or the reducing cell as the case may be, is that the effect of the action of the leach liquor on most oxidized ores is to take some of its iron into solution in ferric state; therefore, the solution coming from the ore solution tank will contain ferric salts and must again be reduced.

If all the liquor were sent direct to the limestone neutralizing tank it would be necessary to use large amounts of limestone for neutralization because of the large amount of ferric chloride present in the solution dissolved from the ore. This is not only costly in limestone but may use up too much acid in the neutralization step. Therefore, a part of the solution is sent from the ore solution tank back to the reducing cell where the ferric chloride dissolved from the ores is reduced, and the solution so reduced upon again passing over the ore picks up more ferric iron but only one-third as much as was present immediately before it was reduced. Thus by repeatedly cycling part of the solution through the reducing tower and over the ore the ferric iron in that part of the solution advanced to the limestone tank may be diminished to any point desired.

Since sulphur dioxide is not used for reduction in the procedure indicated in Fig. 2, but merely electrical energy, there is no source of new acid in the cyclic process itself and the acid must therefore be carefully conserved. This can be done by turning a large portion of the solution from the ore solution tank back to the reducing cell and advancing only a small portion to the limestone tank for neutralizing. Even with this mode there is some loss of acid which can economically be restored by blowing $SO_2$ gas into the liquor in the reducing cell or at some other convenient point.

When the reduction of the anode liquor is performed by an electrolytic reducing cell, oxygen comes off at the anode of the reducing cell during the electrolysis if a sulphate electrolyte is used, and may be recovered as a by-product. When a chloride electrolyte is used chlorine gas is given off and for this reason the electrolytic method of reduction is less desirable for chloride solutions than for sulphate solutions.

The ore to be treated in the solution tank B should be finely ground or pulverized to insure an efficient and speedy action of the solvent. Many oxide ores occur in nature in fine condition and such will require only a final pulverizing treatment. The mixture in the solution tank should be maintained at a high temperature, as the hotter the mixture the more effective is the action. Good results may be obtained at a temperature of 70° C. and above. It is also desirable to stir or agitate the mixture in order to insure constant contact of active solvent with the ore; or percolation may be used. A counter-current method of leaching is advised, by which fresh ore is treated with the weakest solution and the residue of the ore is treated with fresh solution.

It will be understood as already indicated that the procedure is essentially the same whether the solutions used are chloride or sulphate solutions.

We claim:

1. The art of making a ferrous solution, suitable for the electrolytic deposit of iron, which comprises the step of dissolving oxide of iron in a solvent containing dilute acid and a ferrous salt.

2. The art of making a ferrous solution, suitable for the electrolytic deposit of iron, which comprises reducing a solution containing ferric salts to produce a solvent of oxides of iron, and dissolving oxide of iron in said solvent.

3. The art of making a ferrous solution, suitable for the electrolytic deposit of iron, which comprises reducing a solution containing ferric salts by means adapted to produce a solvent of oxides of iron consisting of a solution containing ferrous salts and dilute acid, and dissolving oxide of iron in said solvent.

4. The art of making a ferrous solution, suitable for the electrolytic deposit of iron, which comprises reducing a solution containing ferric salts by means of sulphur dioxide to form a solvent of oxides of iron consisting of a solution containing ferrous salts and dilute sulphuric acid, and dissolving oxide of iron in said solvent.

5. The art of making a ferrous solution, suitable for the electrolytic deposit of iron, which comprises the step of dissolving oxide of iron in a solvent containing dilute sulphuric acid and ferrous sulphate.

6. The art of making electrolytic iron which comprises reducing a solution containing ferric salts by means adapted to produce a solvent of oxides of iron consisting of a solution containing ferrous salts and dilute acid, dissolving oxide of iron in said solvent, and depositing iron from said solvent by electrolysis.

7. The art of making a ferrous solution, suitable for the electrolytic deposit of iron, which comprises reducing a ferric sulphate solution by means adapted to produce a solvent of oxides of iron consisting of a solution containing dilute sulphuric acid and ferrous sulphate and dissolving oxide of iron in said solvent.

8. The art of making electrolytic iron which comprises reducing a solution containing ferric salts by means adapted to produce a solvent of oxides of iron consisting of a solution containing ferrous salts and dilute acid, dissolving oxide of iron in said solvent, depositing iron from said solvent by electrolysis leaving a ferric solution suitable for reduction according to the first step hereinbefore specified in order to be again made into a solvent, thus completing the cycle.

9. The art of making electrolytic iron which comprises reducing a solution containing ferric salts by means adapted to produce a solvent of oxides of iron consisting of a solution containing dilute acid and a ferrous salt, dissolving iron in said solvent, dividing the resultant iron solution so formed, returning part thereof to the ferric solution at the reducing step for repeated reduction, and advancing part only thereof for the deposition of iron by electrolysis.

Signed by us this 9th day of January, 1922.

FREDERIC A. EUSTIS.
CARLE R. HAYWARD.
HENRY M. SCHLEICHER.
DONALD BELCHER.